United States Patent [19]

Kyouya

[11] Patent Number: 4,973,831
[45] Date of Patent: Nov. 27, 1990

[54] FIXING STRUCTURE OF A ONE SIDEDLY FIXED BEAM SPLITTER IN AN OPTICAL PICKUP

[75] Inventor: Shoichi Kyouya, Kakuda, Japan

[73] Assignee: Alps Electric Co., Ltd., Tokyo, Japan

[21] Appl. No.: 315,951

[22] Filed: Feb. 27, 1989

[30] Foreign Application Priority Data

May 31, 1988 [JP] Japan .................. 63-135075

[51] Int. Cl.$^5$ .................................................. G01J 1/20
[52] U.S. Cl. ........................ 250/201.5; 369/44.14
[58] Field of Search .......... 250/201 DF, 201 R, 204, 250/216, 239, 201.5; 350/170, 447; 369/44–46

[56] References Cited

U.S. PATENT DOCUMENTS

| | | | |
|---|---|---|---|
| 3,624,284 | 11/1971 | Russell | 369/44 |
| 3,876,827 | 4/1975 | Janssen | 369/44 |
| 4,037,252 | 7/1977 | Janssen | 369/46 |
| 4,143,402 | 3/1979 | Bricot et al. | 369/46 |
| 4,201,910 | 5/1980 | Copeland et al. | 250/216 |
| 4,613,961 | 9/1986 | Aarts | 250/201 DF |
| 4,644,159 | 2/1987 | Miura | 250/216 |
| 4,677,605 | 6/1987 | Abed | 250/201 DF |
| 4,687,916 | 8/1987 | Emoto et al. | 250/201 DF |
| 4,709,139 | 11/1987 | Nakamura et al. | 250/201 |
| 4,792,674 | 12/1988 | Hirano | 250/216 |

Primary Examiner—David C. Nelms
Assistant Examiner—Stephone B. Allen
Attorney, Agent, or Firm—Guy W. Shoup; Paul J. Winters

[57] ABSTRACT

A fixing structure for the beam splitter of an optical pickup is configured so that the beam splitter is supported at one side, that side being positioned near a light beam emitting element. If the light distribution division surface of the beam splitter is not properly positioned, the optical axis of the reflected or transmitted optical axis will be inclined with respect to the proper reflected or transmitted optical axis. The position at which the light beam optical axis contacts the light distribution division surface is shifted toward the direction for cancelling the inclination of the reflected or transmitted optical axis. Because the distance from the light emitting point of the light beam emitting element to the incident point of the optical axis on the light distribution division surface is $l$ and because the distance from the incident point of the optical axis to the supporting point of the beam splitter is $\sqrt{2}\, l$, the deviation of the converged light point reflected from a disk is nearly cancelled. Accordingly, any upward or downward shifting of the converged light point is corrected and thus detection is accurate.

2 Claims, 3 Drawing Sheets

FIXING STRUCTURE OF A ONE SIDEDLY FIXED BEAM SPLITTER IN AN OPTICAL PICKUP

BACKGROUND OF INVENTION

The present invention relates to providing an optical pickup mounted on a compact disk player, and particularly to providing a fixing structure for a beam splitter in an optical pickup for reducing the optical axis deviation of the light reflected from the light receiving element due to the inclination of the beam splitter.

FIG. 5 illustrates the skeleton of an optical device using a conventional optical pickup. In the optical pickup, the laser beam is reflected toward the left by means of light-distribution division surface 3a (which is drawn as the half-mirror in FIG. 5) of beam splitter 3. This reflected light is made into a parallel beam by collimator lens 4, reflected at a right-angle by means of the total reflection prism 5, and converged on the recording surface of disk D. The beam reflected by the recording surface of disk D returns through objective lens 6, total prism 5, and collimator lens 4 along the original path, and passes through light-distribution division surface (half mirror) 3a to be guided by concave lens 7. The focal point of the light returned through concave lens 7 is extended and guided to pin photodiode 8 and the reflected beam is detected. Also, a cylindrical lens is generally mounted along with concave lens 7, but it is omitted in the drawings. The information reproduction is performed in such a manner that the light quantity of the modulated reflected beam is photodetected by means of the pit formed on the recording of the optical disk. In the prior art, the mounting of beam splitter 3 is performed in the manner that both ends of beam splitter 3 are attached by means of an adhesion agent to chassis 9 of the optical or they are pressed by means of a spring.

In the optical apparatus of the optical pickup, light-distribution division surface 3a of beam splitter 3 is positioned at 45° with respect to both the optical axis of light reflected from recording surface D and returned from objective lens 6 and the axis of light emitted from semiconductor laser 1. But, because of the dimension tolerance of beam splitter attaching portion of the chassis, the tolerance of the degree of parallelism between the attaching portion of beam splitter 3 and light-distribution division surface 3a, the thickness of the adhesion agent, and the thermal expansion or the thermal contraction of beam splitter 3, the angle of the optical axis of the reflected light and the emitted light with respect to the light-distribution division surface 3a is not accurately set at 45°.

The light reflected by the optical disk penetrates the Q point of light-distribution division surface 3a and is focused on the converging light point P. The distance from the Q point to the P point is the same as that from the light-emitting point O to the Q point. Also, the focus distance of the collimating lens 4 converged on the P point is extended to the pin photodiode 8 by means of concave lens 7. If the position of light-distribution division surface 3a deviates from the angle of 45°, the position of the converging light point P is deviated upwardly or downwardly in FIG. 5 and the detecting point of pin photodiode 8 is moved from the original position, with the result that the lower of the signal reproduction or the tracking error detecting accuracy is cancelled.

FIG. 6 represents the deviation of the converging point P (the converging point in the case that the concave lens is not used when light-distribution division surface 3a of beam splitter 3 is further inclined by only the angle $\theta$ (dotted line 3a') from the original angle (solid line 3a) of 45°. Optical axis LB1 of the laser beam produced at the light-emitting center of semiconductor laser 1 is reflected in the perpendicular direction by means of light-distribution division surface 3a to give laser beam LB2 (LB2 shows the optical axis), if light-distribution division surface 3a of beam slitter 3 is accurately set at 45°. And, the reflected light from this laser beam LB2 is again reflected by the recording surface of the disk D, returned to its original path, and penetrates the Q point of light-distribution division surface 3a to be focused at the P point separated from the Q point. But, if light-distribution division surface 3a of beam splitter 3 is further inclined by the angle $\theta°$ as shown by the dotted line 3a' in FIG. 6, the incident angle formed between the light-emitting optical axis LB1 and light-distribution division surface 3a' of the dotted line is set at $45° + \theta$ as represented in FIG. 6. Accordingly, as shown by the dotted line LB2' the angle formed between the reflected optical axis LB2' of the laser beam and light-distribution division surface 3a' is $45° + \theta$. The beam including this reflected optical axis LB2' is again reflected from the recording surface of the disk D, returning along the original path and penetrating the Q point on light-distribution division surface 3a and is focused at the P1 point spaced by more than the distance l from the Q point.

Since light-distribution division surface 3a is inclined from the position of the solid line 3a to the position of dotted line 3a', the angle between LB3 and LB3', the optical axis LB3 being moved to LB3' by the additional inclination of 3a to 3a', is found as follows. In FIG. 6, since the reflecting angle between dotted line 3a' and optical axis LB2' of the reflected beam is $45° + \theta$, said angle is found by adding the angle $\theta$ to the reflected angle and subtracting the 45° therefrom. That is to say, the angle between the transmitted optical axis LB3 and LB3' as follows;

$$(45° + \theta) + \theta - 45° = 2\theta.$$

If light-distribution division surface 3a is inclined by only the angle $\theta$, the incident angle and the reflected angle of the light beam with respect to said surface are accumulated. Transmitted optical axis LB3' is inclined at the angle $2\theta$ with respect to LB3. Thus, if a concave lens is not used, the deviation $\Delta x$ of the converged light point from P to P' is as follows;

$$\Delta x = [l] \, l \sin 2\theta.$$

Also, if beam splitter 3 is inclined at only the angle $\theta$ toward the clockwise direction (the reverse direction of FIG. 6) about the Q point, the deviation of the converged light point P is $l \sin 2\theta$ in accordance with the above calculation but in this case, the converged light point P is moved downward in FIG. 6.

As described above, if light-distribution division surface 3a of beam splitter 3 is further inclined by the angle $\theta$ from the original position, transmitted optical axis LB3' is inclined by the angle $2\theta$ and converged light point P is moved by $\Delta x$ from its original position. This deviation caused the detection point of pin photodiode 8 to be moved from the original point and the detecting accuracy to be lowered.

SUMMARY OF THE INVENTION

The present invention of configured to resolve the conventional problems and to provide a fixing structure for the beam splitter in the optical pickup, in which even though the light-distribution division surface of the beam splitter is further inclined from the original position, the position deviation of the converged light point of the laser beam can be corrected.

According to the present invention, the fixing structure for a beam splitter in an optical pickup, in which the beam splitter is mounted so that the light-distribution division surface is inclined with respect to the optical axis of the light beam extended from the objective lens opposite the disk, and the light emitting element is disposed on one side of the light-distribution division surface and the light receiving element is disposed on other side is characterized in that the beam splitter is supported at one side with the end near the light emitting element being the supporting point.

Also, according to said configuration, the light-distribution division surface of the beam splitter is disposed at the angle of 45° with respect to the optical axis of the light beam extending from the objective lens. The distance from the emitting point of the light emitting element to the point at which the optical axis of light from the light emitting element reaches the light-distribution division surface is l. The distance from the point at which the optical axis of light from the light emitting element reaches the light-distribution division surface to the supporting point of the beam splitter is set at the $\sqrt{2}$ l.

The fixing structure is mounted so that the beam splitter is supported at one side with the end near the light element at the supporting point. Therefore, even though the inclination at the original angle of the light-distribution division surface is altered by deformation of the beam splitter due to the heat and the light reflected and transmitted by the light-distribution division surface is furthermore inclined, the relative position between the inclined light-distribution division surface and the optical axis of the laser beam is shifted to alleviate the inclination of the reflected light or the transmitted light. Thus, in spite of the inclination of the light-distribution division surface, this inclination is not reflected by deviation of the converged light point. That is to say, the converged light point is extended by means of the concave lens with the deviation being corrected and is incident on the pin photodiode.

In addition, if the beam splitter with the light-distribution division surface inclined at 45° with respect to the optical axis of the incident and reflected light beams is supported at one side and the distance from the light-emitting point of the light-emitting element to the position at which the optical axis of light from the light emitting element reaches the light-distribution division surface is l, and if the distance from that position to the supporting point of the beam splitter is $\sqrt{2}$ l, the deviation of the converged light point due to the inclination of the light reflected from the light-distribution division surface is completely cancelled by the deviation occurring in the reverse direction, so that the deviation of the converged light point is resolved.

DETAILED DESCRIPTION OF PREFERRED EMBODIMENTS

Figure 1:
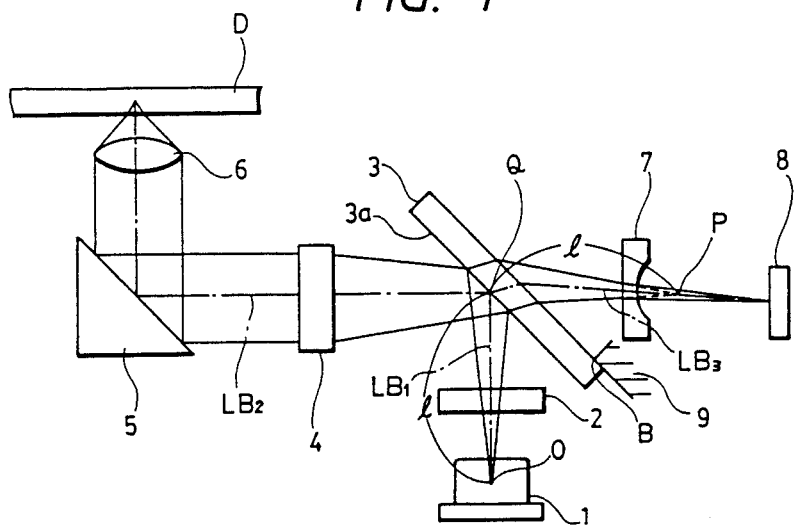
FIG. 1 is a side view of the fixing structure of the beam splitter in the optical apparatus of the optical pickup according to the present invention.
Figure 5:
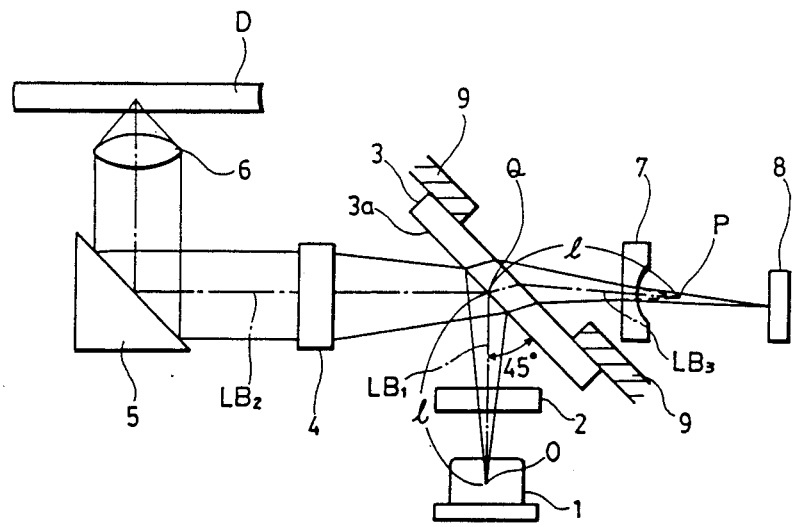
FIG. 5 is a view illustrating the optical apparatus of the conventional optical pickup.
Figure 6:
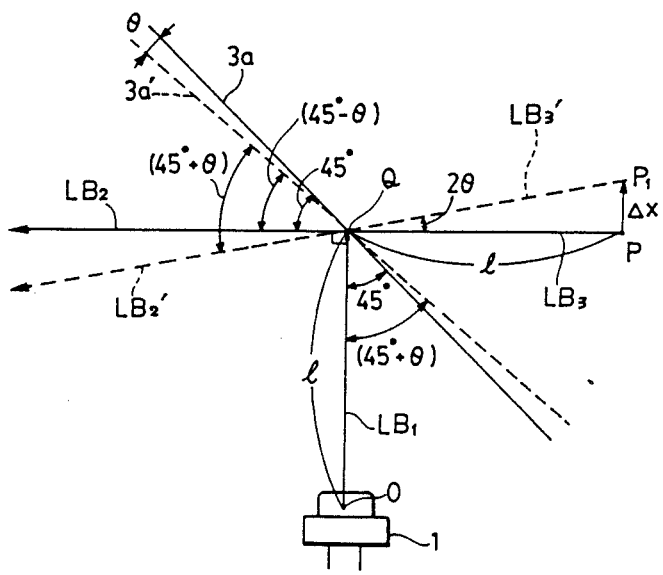
FIG. 6 is a view illustrating the deviation of the converged light point if the light-distribution division surface of the beam splitter shown in FIG. 5 in inclined.

The embodiments of the present invention will be explained below with reference to the accompanying drawings FIG. 1 schematically represents the structure of the optical apparatus of the optical pickup according to the present invention. This embodiment and the prior art example of FIG. 5 are different in the fixing structure of the beam splitter but similar in other aspects.

Beam splitter 3 in this embodiment is supported at one side with the side near semiconductor laser 1 supported at point B of chassis 9 of the optical pickup. That is to say, beam splitter 3 is fixed by means of an adhesion agent to supporting point B of chassis 9. In the case of this embodiment, light-distribution division surface of beam splitter 3 is opposite to form a 45° angle with reflected optical axis LB2 from objective lens 6 and with light emitting optical axis LB1 from semiconductor laser 1.

For the case that beam splitter 3 is further inclined by the angle $\theta$ from the original angle of 45° due to a mounting angle error at the supporting point or temperature changes, etc., the correction relative to the deviation of the converged light point will be explained below with reference to FIG. 2.

Figure 2:
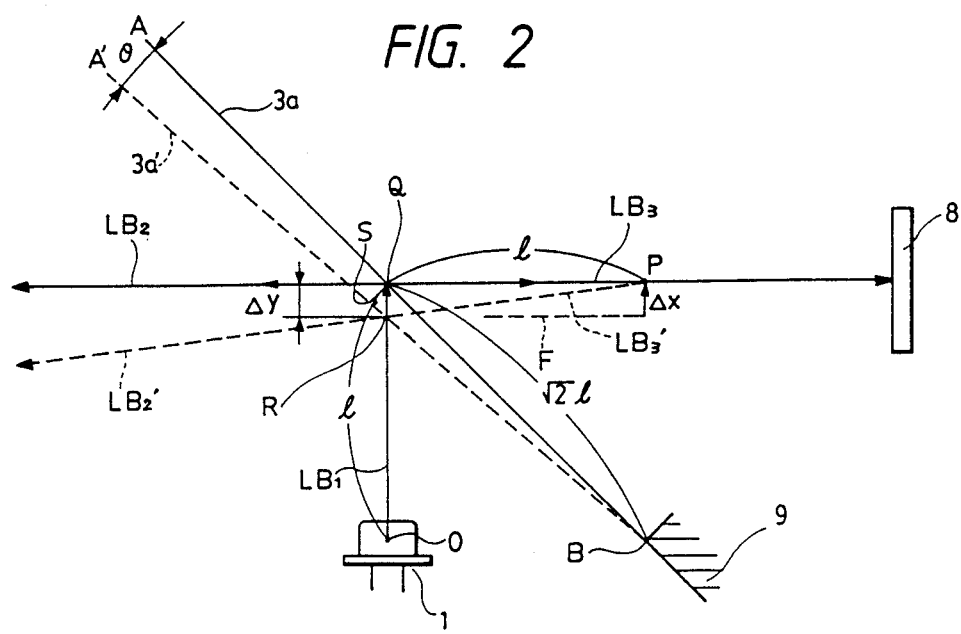
FIG. 2 and FIG. 3 are views illustrating the procedure for correcting position of the converged light point of the laser beam if the light-distribution division surface of the beam splitter is inclined.

In FIG. 2, the solid line 3a represents the light-distribution division surface of beam splitter 3 positioned at the proper position of beam splitter 3. This light-distribution division surface 3a is supported at the B point at one side to be inclined at 45° with respect to optical axis LB2 extending to objective lens 6 and the light emitting optical axis LB1 of semiconductor laser 1. Also, the distance travelled by optical axis LB1 of the laser beam from the light emitting center O of semiconductor laser 1 to the Q point on light-distribution division surface 3a of beam splitter 3 is the length l. Also, in this embodiment the length from said Q point to supporting point B of beam splitter 3 is $\sqrt{2}$ l.

Laser beam LB1 produced at light emitting center O is reflected from point Q with a reflecting angle of 45° with respect to the light-distribution division surface drawn as the solid line 3a and this reflected light is again reflected by means of the reflecting surface of the disk D. Then, the reflected light returns along its original path, passing through the Q point on light-distribution division surface 3a and being focused at the position P spaced away from the Q point by the distance l.

The dotted line 3a' shows the state such that the light-distribution division surface of beam splitter 3 is further inclined by the angle $\theta$ counterclockwise from the original position. In this case, optical axis LB1 from semiconductor laser 1 reaches the position R of the light-distribution division surface 3a' shown by the dotted line, and also reflected optical axis LB2' and transmitted optical axis LB3' pass through the point R. Accordingly, if the light-distribution division surface is inclined by an angle θ, the converged light point P is shifted above the horizontal line F shown in FIG. 2 passing through the point R.

For example, $$\Delta x = l \sin 2\theta$$

Then, in this embodiment of the drawing since the point at which optical axis LB1 reaches light-distribution division surface 3a' is moved downward by the distance ΔY as indicated as the distance Q-R in the drawings, said Δx is cancelled by this ΔY.

Herein, the distance of said Q→R is obtained A line perpendicular to 3a' is drawn from point Q to dotted line 3a' to set their crossing point at the point S. Therefore, a triangle QRS formed is a right isoscelles triangle in which the angle formed at both ends of the side QR is set at 45°. The length of the QS is $\sqrt{2} l \sin \theta$. Thus, the length of the side QR in the right isosceles triangle is $\sqrt{2}\cdot\sqrt{2} l \sin \theta = 2 l \sin \theta$. If the angle θ is indicated in radians, since θ is small, sin θ is nearly equal to θ. Thus, 2 l sin θ is about 2·l·θ. Also, the value of 2 l θ is nearly equal to about l sin 2 θ. Accordingly, the distance of QR, which is also Y is as follows;

$$\Delta Y = l \sin 2\theta.$$

This value is nearly equal to that of the Δx.

That is to say, the amount Δy of the deviation in the reflecting point Q→R is cancelled by the amount Δx of deviation which occurs in the reverse direction. Then, in the case of this embodiment, the deviation of the converged light point P due to the inclination θ of the light distribution division surface 3a' is completely resolved.

Figure 3:
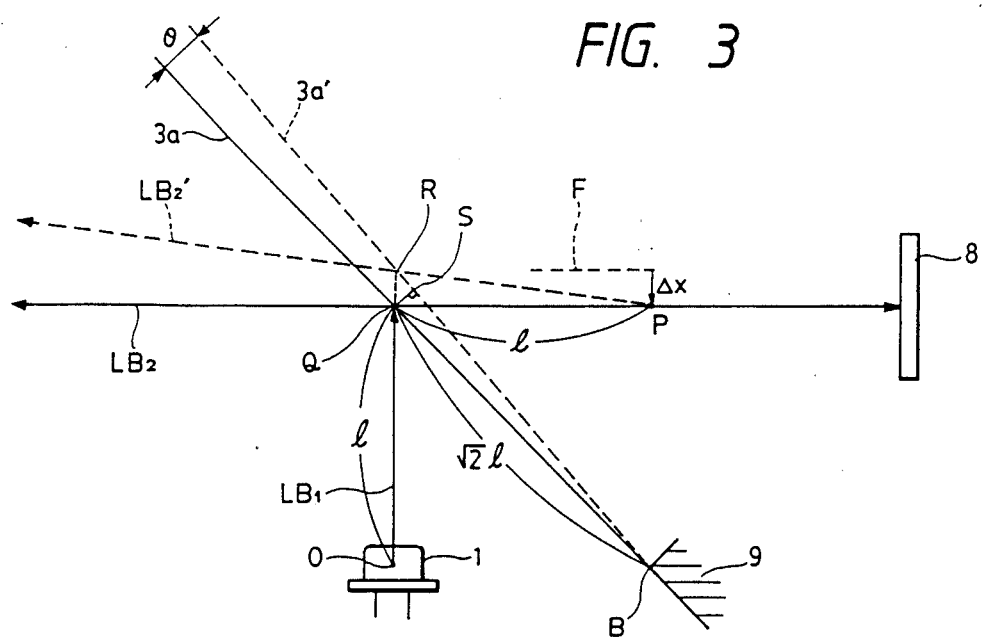

On the other hand, as indicated in FIG. 3, if light-distribution division surface 3a of beam splitter 3 is inclined by the angle θ in the clockwise direction about fixing end B (as shown by dotted line 3a'), optical axis LB1 of the laser beam produced at the light emitting center O of semiconductor laser 1 is incident on the point R of light-distribution division surface 3a'. The deviation of the converged light point P of light returned from the disk is resolved by the deviation Q→R in the same manner as described above.

In this case, due to the clock wise inclination of the light-distribution division surface 3a' the converged light point P is shifted Δx=l sin 2θ downwardly with respect to the horizontal line P passing through the point R. Then, in this case the side QS is $\sqrt{2} l \sin \theta$, and the side QR is $\sqrt{2}\cdot\sqrt{2} l \sin \theta$ which nearly equals l sin 2θ. That is to say, due to the upward shift of the point at which the optical axis LB1 reflects from light-distribution division surface 3a, the amount Δx is nearly cancelled and the deviation of the converged light point P does not occur.

Figure 4:
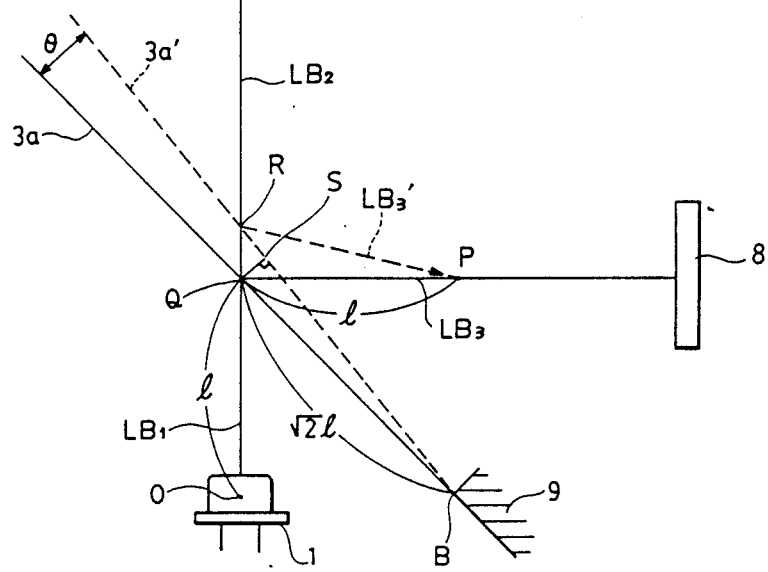
FIG. 4 is a view illustrating the procedure for correcting the converged light point in the other embodiment of the present invention.

FIG. 4 shows the other embodiment of the present invention. In this embodiment, collimating lens 4 and the objective lens (not shown) are arranged to intercept that portion of the laser beam produced by semiconductor laser 1 which passes through light-distribution division surface 3a. Pin photodiode 8 and the concave lens (not shown) are disposed to intercept the returned light from the disk which is reflected from light-distribution division surface.

In this case, also beam splitter 3 is supported at one side with the end near semiconductor laser 1 supported at the supporting point B. The distance from the point Q, at which the optical axis LB1 is reflected from light-distribution division surface 3a, to the supporting point B is set at $\sqrt{2} l$ (l is the distance from the light emitting point O to Q). In this case, also as explained in FIG. 3, if light-distribution division surface 3a' is inclined by the angle θ to be in the position as shown in FIG. 4, the point P shifts downwardly by Δx=l sin 2 θ with respect to the horizontal line passing through the point R. In this case, the side QS is l sin θ, QR is $\sqrt{2}\cdot\sqrt{2} l \sin \theta$, and the amount of the deviation directed upward from Q to P in the drawings is l sin θ. Accordingly the shift Δx is cancelled and the deviation of the converged light point P nearly does not occur.

As described above, according to the present invention beam splitter 3 is inclined in either a clockwise or counter clockwise direction which forces the converged light point P to be shifted either up or down, but the point R at which the optical axis of the laser beam contacts the light distribution division surface 3a' is shifted from Q to R by the same amount as the deviation of point P but toward the reverse direction. Thus, the deviation of the converged light point P is completely removed and accurate detection is performed by means of the pin photodiode.

While the present invention has been described on the basis of the above embodiments, it is to be understood that the present invention is not limited to the preferred embodiments and various modification can not be made therein without losing the gist of the present invention.

For example, in the above embodiment the distance from the supporting end B of beam splitter 3 to the Q point, at which the optical axis LB1 reaches light-distribution division surface 3a is the distance of $\sqrt{2} l$, l being the distance from the light emitting center of the semiconductor laser to the Q point. Therefore, the deviation of the converged light point P is not completely corrected without this positional relationship, but some amount of the deviation can be corrected.

Also, in the above embodiment light distribution division surface 3a of beam splitter 3 is supported at one side to be inclined at 45° with respect to the optical axis of objective lens 6, but it is preferable to select other angels. This case can be resolved by changing the disposing position of the other parts such as semiconductor laser 1.

Also, light-distribution division surface 3a of beam splitter 3 is a half-mirror, but it has the same effect as a polarized light reflecting surface.

As described above, the present invention is configured so that in an optical pickup comprising a beam splitter provided with a light-distribution division surface inclined with respect to the optical axis extended from the objective lens. The beam splitter is supported at one side, at the end near the light emitting element. Thus, if further inclination of the light-distribution division surface of the beam splitter occurs, the reflected optical axis or the transmitted optical axis due to the light-distribution division surface is also further inclined with respect to the former reflected optical axis or the transmitted optical axis. The position at which the laser beam optical axis contact the light distribution division surface is shifted toward the direction for cancelling the inclination of the reflected optical axis or the transmitted optical axis. Due to it, any up and down shifting of the converged light point is corrected and thus an effect for performing accurate detection is obtained.

According to this invention, because the distance from the light emitting point of the light emitting element to the incident point of the optical axis on the light-distribution division surface is l, and the distance from the incident point of the optical axis to the supporting point supported at one side is $\sqrt{2}\, l$, the deviation of the converged light point is nearly cancelled. Accordingly, even though inclination of the beam splitter occurs, the effect of completely removing the deviation of the converged light point can be obtained.

What is claimed is:

1. An optical pickup comprising:
   a chassis;
   a beam splitter having a surface and at least one end, only one end of said beam splitter being fixed to said chassis, said chassis thereby supporting said beam splitter at a supporting point;
   a light emitting element emitting a light beam having an optical axis, said optical axis being incident upon said surface at a second point;
   said second point being spaced from said light emitting element by approximately a distance l; and
   said second point being spaced from said supporting point by approximately a distance $\sqrt{2}\, l$.

2. An optical pick-up according to claim 1 wherein said optical axis forms approximately a 45° angle with said surface.

* * * * *

UNITED STATES PATENT AND TRADEMARK OFFICE
CERTIFICATE OF CORRECTION

PATENT NO.    : 4,973,831
DATED         : November 27, 1990
INVENTOR(S)   : Shoichi Kyouya It is certified that error appears in the above-identified patent and that said Letters Patent is hereby corrected as shown below:

ON TITLE PAGE:
Title should read:

-- FIXING STRUCTURE FOR A BEAM SPLITTER IN AN OPTICAL PICKUP --

Signed and Sealed this

Twenty-third Day of June, 1992

*Attest:*

DOUGLAS B. COMER

*Attesting Officer*      *Acting Commissioner of Patents and Trademarks*